(12) United States Patent
Dronzek

(10) Patent No.: US 7,090,740 B2
(45) Date of Patent: *Aug. 15, 2006

(54) TECHNIQUES FOR LABELING OF PLASTIC, GLASS OR METAL CONTAINERS OR SURFACES WITH POLYMERIC LABELS

(75) Inventor: Peter J. Dronzek, Thornwood, NY (US)

(73) Assignee: Process Resources Corporation, Thornwood, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/694,297

(22) Filed: Oct. 27, 2003

(65) Prior Publication Data

US 2004/0086668 A1    May 6, 2004

Related U.S. Application Data

(60) Continuation of application No. 09/875,738, filed on Jun. 6, 2001, now Pat. No. 6,663,746, which is a division of application No. 08/948,916, filed on Oct. 10, 1997, now Pat. No. 6,306,242.

(51) Int. Cl.
*C09J 5/02* (2006.01)

(52) U.S. Cl. .................. 156/308.8; 428/350; 428/353; 428/354; 156/243; 156/306.6; 156/319; 156/324.4

(58) Field of Classification Search ................ 428/350, 428/353, 354; 156/308.8, 243, 306.6, 319, 156/324.4
See application file for complete search history.

(56) References Cited

U.S. PATENT DOCUMENTS

| | | | | | |
|---|---|---|---|---|---|
| 4,055,698 | A | * | 10/1977 | Beery | 428/346 |
| 4,440,884 | A | * | 4/1984 | Jannusch | 524/26 |
| 5,562,962 | A | * | 10/1996 | Tung | 428/200 |
| 5,651,852 | A | * | 7/1997 | Mitchell et al. | 156/252 |
| 6,238,509 | B1 | * | 5/2001 | Herlfterkamp et al. | 156/314 |
| 6,306,242 | B1 | * | 10/2001 | Dronzek | 156/308.8 |
| 6,663,746 | B1 | * | 12/2003 | Dronzek | 156/306.3 |

FOREIGN PATENT DOCUMENTS

DE    1569879    *    5/1972

* cited by examiner

*Primary Examiner*—Daniel Zirker
(74) *Attorney, Agent, or Firm*—James V. Costigan; Hedman & Costigan

(57) ABSTRACT

The invention provides a method for fastening a polymeric label to a glass, plastic or metal container or surface by means of a water based adhesive composition by the following steps:
(a) applying a layer of a hydrophilic solid material to a polymeric label to form a hydrophilic layer;
(b) applying water or a water based adhesive to the hydrophilic layer to form a fastenable polymeric label;
(c) fastening the fastenable polymeric label to a glass, plastic or metal container or surface; and
(d) allowing said the polymeric label to dry on the glass, plastic or metal container or surface.

4 Claims, No Drawings

TECHNIQUES FOR LABELING OF PLASTIC, GLASS OR METAL CONTAINERS OR SURFACES WITH POLYMERIC LABELS

This application is a continuation of Ser. No. 09/875,738 filed Jun. 6, 2001, now U.S. Pat. No. 6,663,746 which is a division of Ser. No. 08/948,916 filed Oct. 10, 1997 now U.S. Pat. No. 6,306,242.

FIELD OF THE INVENTION

This invention relates to polymeric sheets or rolls particularly adapted for use as labels in the post mold labeling of plastic, glass or metal containers or surfaces. More particularly, the present invention relates to polymeric film substrates adapted for printing that also have a hydrophilic surface layer for use as labels in post mold labeling applications using conventional wet applied water based labeling equipment typically used for the application of paper labels. In another aspect the invention relates to such labels which possess the beneficial properties of the known plastic label substrates, but which are able to be applied on conventional post mold paper labeling equipment using wet applied water based solutions comprising water, water blended with a selected crosslinking catalyst, adhesives or adhesives blended with a selected crosslinking catalyst.

BACKGROUND OF THE INVENTION

Plastic and glass containers or bottles are prevalent in a wide variety of shapes and sizes for holding many different types of materials such as detergents, chemicals, motor oil, beer, etc. These containers are glass or plastic (mono or multi layers) of polyethylene, polypropylene, polyester or vinyl along with other specialty blends for specific barrier and product resistance performance. Generally such containers are provided with a label which designates the trade name of the product and may contain other information as well. The early art which still is prevalent today employed the use of labels manufactured from paper substrates that were applied with a water based adhesive. Subsequently, dry pressure sensitive self adhesives and in mold labels manufactured from paper have been and continue to be used. The shortcomings of paper labels with regard to tearing, wrinkling, creasing and the like due to age and moisture, or due to a lack of deformability when applied to a deformable plastic substrate have been well documented in the labeling industry. Because of this and the need to produce recyclable plastic containers, over the years a great deal of effort has been expended to develop container decoration techniques and durable film substrates which would overcome these shortcomings.

Film facestocks for container decoration which have resulted from these efforts can be applied to glass and plastic containers as self adhesive pressure sensitive labels as described in the prior art. The use of self adhesive paper and film "pressure sensitive adhesive" (PSA) labels that have been preprinted and supported on a release liner is not a cost effective option because of the added cost of the release liner used to support and render processable the self adhesive face stock. The cost of this type of structure combined with the added cost of disposal of the liner does not make pressure sensitive labeling a desirable option from an economic or environmental standpoint. In addition, new capital intensive labeling equipment is required to transition from wet applied Post Mold Labels (PML) to self adhesive PSA labels plus the effect of a new process on an existing packaging line in terms of learning cure and experience.

Another film face stock labeling technique that has evolved is the use of heat activated in-mold labels as described in the prior art where a preprinted plastic label with a heat activated adhesive is placed in the mold before the molten plastic resin is injected or blown into the mold cavity at elevated temperature and pressure which activates the adhesive and fuses the label substrate to the container in-mold. The use of film based in-mold label substrates presents a more cost effective alternative then self adhesive pressure sensitive labels in terms of substrate cost but as this technology has progressed, it has been found that productivity is impacted by the label feeding step into the mold which is performed in a complex, continuous and rapid manner which results in large amounts of scrap material. Also, the initial capital investment required to tool up for a container specific in-mold label process for new molds and the complex electromechanical maintenance intensive feeding devices is significant. Another detriment for this process is the potential inventory carrying costs for varieties of labeled containers that come into play with predecorated containers such as in-mold for those who would choose to apply the label immediately pre or post filled.

Post mold decoration of glass and plastic containers in the current art can also be accomplished by direct screen printing on the container. Direct screen printing on the container is not a cost effective process and also presents the aforementioned inventory problems along with added cost for freight to and from a screen printer. The graphical possibilities for label copy are limited in terms of cost and quality with this technique. Commodity products can not support the cost of this labeling technique.

Another post mold technique that has been popular is the "Therimage" process. This process transfers a reverse printed image from a transfer release sheet under temperature and pressure to produce decorated containers. The "Therimage" technique of transferring a reverse printed image is costly because of transfer sheet costs and presents the same disposal problems and costs with the transfer sheet as occurs with the aforementioned release liner used in conjunction with self adhesive labels. Graphic design and quality is limited with this technique.

Other techniques for labeling various plastic and glass containers with preprinted paper or film label substrates include the use of hot melt adhesives which are applied to the label substrate or container in a molten state with container and substrate subsequently married while the hot melt is molten. When the hot melt adhesive cools, it sets up and bonds the label substrate to the container.

This technology requires the use of sophisticated melting and application equipment that must be operated, cleaned and maintained at elevated temperatures. This technology works well with complete 360 degree wrap around labels but has not evolved to the point to allow consistent labeling of a die cut or square cut label with less than 360 degree wrap. Affixing a cut label to an area on a container with 100% or patterned adhesive application using hot melt adhesives has not been commercially perfected. Complete wrap around hot melt applied labels where one end of the label is affixed to the container while the other end is wrapped around the container and affixed with hot melt to the label substrate is proven hot melt label application technology that works well for film and paper label substrates. This technology requires that the container be round and does not fit for individually labeled panels on a containers such a rectangular oil, contoured detergent or beer containers where a neck and front label only are applied. Another drawback is the added cost for label substrate when this technique is used since more label substrate is required because of the 100% wrap around.

Lastly, and still one of the most prevalent labeling techniques is the application of paper based labels to glass and plastic containers using natural and synthetic labeling adhesives such as BL300 produced by Henkel Adhesives or OC363-20 produced by O.C. Adhesives Corp. which are known to the art.

This is a safe (water based) proven technology that has grown and been employed for many years and consequently there are many existing machines that have been installed for this type of labeling technique such as from Krones, Neutraubling, Germany that run cut precut labels or Koyo, Japan which runs roll stock that is cut on machine to the label size. The cut label techniques and associated adhesives work well with paper based substrates applied to glass, plastic or metal containers because the wet adhesive wicks (absorbs) into the paper substrate from the applicator roll, pad or pallet which breathes and allows the moisture from the water carrier to be absorbed by and dry thru the paper base.

This technique obviously will not work with non-porous polymeric substrates as the adhesive can not wick into the polymeric substrate for initial tack and adhesive transfer to the label or drying thru the plastic. Typically, wet applied cut label machines work where glued pallets remove the label out of the label holding magazine while simultaneously gluing the back side of the label. This is accomplished by applying a thin glue film to the pallet which is then pressed in intimate contact against the first label in the stack.

After its removal, the label sticks on the entire glued area of the pallet until transferred to a "gripper" cylinder and removed from the pallet. The gripper cylinder than transfers the label to the container to be labeled. The various machine designs and techniques are well known within the labeling industry and to those skilled in the art. The "Krones Manual Of Labeling Technology" by Hermann Kronseder dated December 1978, is hereby incorporated by reference.

Attempts have been made to use polymeric substrates with high moisture vapor transmission rates (MVTR) and tacky or pressure sensitive adhesive on conventional labeling equipment with little success. The tacky adhesive required to stick to the water impervious polymeric substrate causes machining problems by gumming up the adhesive application system and creates cleanup issues. The high MVTR substrates also did not have good wet tack with existing commercially available adhesives that would machine without problems and did not dry rapidly enough making the labels prone to "swimming" or moving from the desired application area during down stream processing. In addition, the adhesives do not wet out and apply uniformly to non hydrophilic surfaces with the crude adhesive metering and application systems currently in use on existing paper labeling machinery. Without uniform application, wet out and wet tack, it will be impossible to apply a clear label that has the no label look because of adhesive and application imperfections.

Accordingly, it is an object of the invention to provide a polymeric label particularly adapted for use in post mold wet applied labeling of polymeric, glass and metal containers that would readily feed from the label magazine or gripper, adhere with sufficient tack without moving through post labeling handling and processing including but not limited to conveying, filling, case packing and pelletizing.

It is also an object of the invention to provide a polymeric label particularly adapted for use in post mold wet applied labeling of polymeric and glass containers that would have sufficient wet tack and affinity for water, a water based solution or adhesive used to allow for transfer of the water, water based solution or water based adhesive to the polymeric label substrate from the applicator roll(s), pad(s) or pallet(s) of the labeling machine.

It is also an object of the invention to provide a polymeric label for use in post mold wet applied labeling of polymeric and glass containers that would have a coefficient of expansion or contraction under the conditions which the container sees which is the same or compatible with that of the polymeric resin, glass or metal from which the container is made so that expansion and contraction of the container will not wrinkle or otherwise affect the integrity of the label.

It is also an object of the invention to provide a polymeric label for use in wet applied post mold labeling which would combine suitable properties of modulus of elasticity and flexibility and would not be degraded by handling and flexing of the subsequent container. Finally, it would be desirable to provide a label for use in wet applied post mold labeling of polymeric containers which does not have to be removed from such containers in order to recycle or regrind defective or post consumer polymeric containers.

SUMMARY OF THE INVENTION

In considering the performance or economic shortcomings of prior art materials, I have discovered a process by which a polymeric label may be applied to a glass, plastic or metal container or surface by means of a water based adhesive composition, said method comprising:
(a) applying a layer of a hydrophilic solid material to a polymeric label to form a hydrophilic layer on said polymeric label;
(b) applying water, water containing a cross-linking agent or a water based adhesive over said hydrophilic layer to form a fastenable polymeric label; (c) fastening said fastenable polymeric label to a glass, plastic or metal container or surface; and
(d) curing said polymeric label on said glass, plastic or metal surface or container.

DETAILED DESCRIPTION OF THE INVENTION

Hydrophilic materials are selected so that their coefficients of expansion or contraction, thickness and modulus of elasticity when applied to a polymer film will result in a polymeric film facestock that will have hydrophilicity, absorbtivity, wet tack and drying properties that will permit the polymer film to be applied to polymeric, glass or metal containers via water based wet labeling techniques on standard paper labeling equipment. The apparatus which is used to apply paper labels is well known to those in the art. The polymeric label substrate with the hydrophilic coating will demonstrate sufficient "wet tack" during the label application period and the label drying period to permit containers to be handled and processed. The polymeric film based facestock will provide a label with printability, chemical and dimensional stability, resistance to cracking, tearing, creasing, wrinkling or any other degradation of the sort experienced by paper labels due to physical or environmental extremes.

The invention also permits the use of a water based adhesive to fasten a clear or contact clear polymeric film substrate which is reverse printed and then overcoated with the hydrophilic layer to glass or plastic containers using a water base adhesive. As used herein the reference to a "container" includes a surface of an objects made of glass, plastic or metals such as dishes, bottles, cans, toys and building materials.

Optionally, if a metalized coating of a thin metal film is deposited on the polymeric sheets or rolls, premium quality decorative labels with all of the advantages set forth above will be provided.

The hydrophilic component or blends containing the hydrophilic component will be applied in the present invention to the selected polymeric sheet in a continuous or patterned layer to provide the absorptive, wet tack and drying properties that are necessary to enable polymeric sheets to be successfully used as label substrates on polymeric or glass containers when applied with water based wet labeling techniques. The hydrophilic layer, which may be applied by either a coating or an extrusion technique, has the function of absorbing a major portion of moisture to activate the layer as an adhesive thus causing selected hydrophilic layers to function as an adhesive without any applied adhesive or to absorb the moisture from an adhesive if used, to cause the polymer film to adhere to the glass, plastic or metal container and to set up rapidly and positively.

It is also possible to coestrude the hydrophilic layer with the polymer film layer.

The choice of polymeric substrate for the label film will determine the rigidity, deformability or conformability, regrindability, printability and expansion or contraction characteristics required for application to the selected container without the problems associated with paper labels.

In addition, the polymeric film substrate for the substantially label will be selected so that it will expand or contract to the same degree as the container so that when ambient conditions change, the label will not pucker or blister.

The term "film facestock" or "polymeric label substrate" as used herein should be taken for purposes of the present invention to refer to a material compatible in terms of rigidity, deformability or conformability, regrindability if a plastic container and expansion or contraction characteristics with the plastic or glass container to be labeled. Similarly, the "hydrophilic layer" previously mentioned has the properties of wet tack, absorbtivity, drying, sufficient adhesion to the polymeric label substrate and affinity and adhesion to the labeling adhesive if used in the wet or dry form.

It is contemplated that selected hydrophilic layers can be wet or remoistened without adhesive for use on a glass, plastic or metal container or a water based adhesive can be used to affix the polymeric label substrate with the hydrophilic layer to the glass, plastic or metal container. For deformable containers, the adhesive if used, can be selected from those commercially available that are characterized by the ability to form a bond with the container and a hydrophilic layer such that when dry, the strength of the container wall-adhesive interface and the hydrophiliic layer-adhesive interface and the cohesive strength of the adhesive itself are all greater than the forces required for deformation of the label.

As used herein and in the appended claims, the term "hydrophilic" is used to describe materials or mixtures of materials which bind or absorb water. The preferred "hydrophilic" materials are those acrylic polymers which bind or absorb water. The especially preferred "hydrophilic" material is DP6-6006, a sodium polyacrylate from Allied Colloids.

It is also an aspect of the present invention to use crosslinkable (reactive) components in the hydrophilic layer that can cure with a catalyst supplied in the rewetting water or adhesive (if used) that will promote adhesion to the labeled container along with chemical and moisture resistance. Examples of cross-linkable materials are those which contain carboxyl groups, hydroxyl groups or other functional group which will react with a cross-linking agent. The catalyst can also be added to the adhesive which may or may not have reactive components which would cure the adhesive and hydrophilic layer together or the catalyst may only cross-link the hydrophilic layer. When water and a cross-linking catalyst are combined, the composition will comprise 0.25–10% by wt. of cross-linking catalyst.

The coated, extruded or coextruded hydrophilic layer functions in effect as an adhesive layer which is defined as a substance capable of combining two surfaces by the formation of a bond whether it is a moist hydrophilic layer to glass or polymer or a dry hydrophilic layer to a wet labeling adhesive which is an intermediate layer that bonds to both the hydrophilic layer and glass or polymer of the container when dry.

The use of the proper hydrophilic layer for a given polymeric labeling substrate and container to be labeled will have a direct effect on the speed which the labeling line can be run.

When considering the choice of the material which forms the hydrophilic layer, which may be applied by coating, coextrusion or extrusion, one must consider the label substrate, container to be labeled, labeling machinery, water or adhesive application technique and down stream processing requirements such as filling, conveying and packing. In addition the final appearance of the label such as the clear no label look or a plain opaque label must be considered in the choice of the components of the hydrophilic layer. Generally, a deposit of from 0.25 to 8 lbs./3000 $FT^2$ of the hydrophilic layer, when dried, may be employed on the polymeric film layer, depending on the particular hydrophilic material that is selected.

It is critical to the successful application of a hydrophilic polymeric film label to control how the water or water based adhesive is applied to the hydrophilic layer, how deposition (weight or thickness) is controlled and how the resultant combination with the container is pressed together. Generally, from 0.25 to 1.5 g./sq. ft. of water or water based adhesive is applied to the hydrophilic layer with 100% coverage of the label. If a grid or other pattern of adhesive is employed, then the amount of adhesive may be reduced. If a grid pattern is employed, the hydrophilic layer may be applied to be substantially in register with the adhesive layer. It will generally be possible to reduce the typical amount of adhesive applied to a label when using the hydrophilic layer of the invention to an amount which is 20–80% of the amount that is typically employed for affixing paper labels to a surface. The choice of the hydrophilic layer and the type of label substrate and container to be adhered together, as discussed above, the plant processing conditions after labeling, storage requirements and the end use requirements that must be met such as high temperature resistance or ice proofness and the choice of an intermediate adhesive layer are important considerations. There are many more specific variables within these considerations all of which influence the formulation of the proper hydrophilic layer and adhesive (if used) for a specific application.

The bonding of the hydrophilic layer with or without an intermediate adhesive layer can be accomplished with mechanical (non smooth surfaces) and specific adhesion when the hydrophilic layer is wet with water or a water based solution that could contain a cross-linking agent or a water based adhesive that could contain a cross-linking component. Examples of cross-linking agents include zirconium salts of mineral acids, such as Bacote 20 from Magnesium Elektron, Inc., Polyfunctional Aziridine such as Xama-2 from EIT, Inc., water soluble polyamide-epichlorohydrin material such as Polycup 172 and the like which may be used at a level of 0.2–8% by weight of the adhesive composition.

Mechanical adhesion is defined as the bonding between surfaces in which the adhesive holds the parts together by inter-locking action and actual physical penetration. Specific adhesion is the bonding between surfaces which are held together by molecular forces wherein the surfaces are non porous and no penetration is possible.

These forces are related to the polarity and size of the molecules and the initial action in obtaining a bond when the hydrophilic surface is wet and a bond develops through molecular forces.

In mechanical as well as specific adhesion, the hydrophilic layer with optional intermediate adhesive layer must "wet" both surfaces completely or weak bonded areas will develop as it dries or "sets" resulting in a poor bond. Not only is wetting of the surfaces critical, penetration is also important. Penetration is important since most combinations of surfaces to be adhered together involve at least one porous or absorptive surface which controls the "setting" characteristics. To facilitate wetting of the surface and penetration, the hydrophilic layer or hydrophilic layer with intermediate adhesive must be in a fluid state which for purposes of this invention is accomplished by applying water or water based adhesive to the selected hydrophilic layer which when applied to the container to be labeled brings the hydrophilic layer and container wall into intimate molecular contact. By using a wet hydrophilic layer or intermediate adhesive which also wets and penetrates the hydrophilic layer as well as the container surface, a fluid region is created that flows to cover the surface as completely as possible. This is critical to the invention where even an apparently smooth surface in reality is composed of a random network of hills and valleys. When the hydrophilic layer is in the wet condition, with or without adhesive, it serves as a wetting bridge to promote adhesion.

Various commercially available adhesives can be matched with hydrophilic layers to provide good adhesion of polymeric film layers to a plastic or glass surface. These material include starch based adhesives or casein based adhesives now predominantly used for glass applications since they do not bond well to plastic or metal. Specific adhesives hat may be employed include EVA based materials which have free carboxyl groups, converted starch solutions, PVA based adhesives, casein based adhesives, synthetic resin dispersions for metal or plastic containers or blends of synthetic and starch based products and the like.

It is clear that one specific hydrophilic layer may not fit all applications but hydrophilic layers can be tailored to particular applications based on the conditions and requirements for wet PML labeling of polymeric substrates.

For a coextruded product, if a adhesion promoting tie layer is employed, materials such as maleic anhydride, ethyl acrylic acid and the like may be employed at levels up to 5% by weight of the hydrophilic composition. For a coated product, if a primer is employed, materials such as chlorinated polypropylene, polyethylene imine (PEI) and the like may be employed at levels of 0.05–1.0 #/3000 sq. ft.

Plasticizers such as n-di-octylphthalate may be employed at a level of 0.5–3% by weight of the adhesive composition to prevent the polymeric film label from losing flexibility.

The slip aids and anti-blocking compounds prevent excessive friction between the hydrophilic layer and the printed label face and also control the effect of ambient moisture levels which may tend to cause label blocking and interfere with the operation of high speed automated machinery which is used to apply labels. These materials may be used at a level of 0.5–3% by weight of the hydrophilic layer composition and include materials such as microcrystalline wax emulsions, erucamide dispersions, polytetrafluoroethylene compositions, silicone beads, modified silicone solutions, parafin wax emulsions, high melting polypropylene emulsions, carnauba wax emulsions, oxidized ethylene/EVA compositions, micronized polyethylene wax/PTFE emulsions, micronized polypropylene, micronized fluorocarbons such as PTFE (Teflon), micronized polyethylene, silica and talc.

If an antistatic agent is employed, it may be present at a level of 0.5–3% by weight of the hydrophilic formulation. These materials include quaternary ammonium salts such as Ethaquad C12, sulfonated styrene maleic anhydride, sulfonated polystyrene, sulfonated vinyl toluene maleic anhydride, conductive polymers and organo modified silicones such as Silwet L77.

Protective coatings may be used to protect the exposed polymer film of the label when applied at a level of 0.25–4 lbs./3000 sq. ft. using conventional application techniques. These materials include styrenated acrylics such as OC1043 from O.C. Adhesives Inc., urethanes such as AS455 from Adhesion Systems Inc., Flexcon Release Varnish from Manders—Premier.

If desired, a humectant may be added to the adhesive at a level of 0.5–3% to provide curl resistance and to impart layflat properties to the polymeric film labels. These humectants include urea, polyethylene glycols such as PEG400, polyvinyl alcohol, glycerine and the like.

DESCRIPTION OF THE PREFERRED EMBODIMENTS

EXAMPLES

Thirty five samples were coated with coating compositions which were the same or different. The samples were evaluated on machine trials and controlled laboratory scale experiments. The aqueous solutions were applied to the following polymeric substrates: polypropylene (PP), high density polyethylene (HDPE) and polyester (PET) using gravure or wire wound metering rod techniques.

Components used to make up the various hydrophilic layers are as follows:

DX=Dextrine—2723625 Findley Adhesives

1072=Dextrine Compatible Polyvinyl Acetate Homopolymer Emulsion Binder Resin-25-1072—National Starch and Chemical Company 05413A=Vinyl Acetate Ethylene Emulsion Remoistionable Gum Adhesive—05413-A—Apex Adhesives PVA=Polyvinyl Alcohol Cook—Airvol 203 Air Products And Chemicals Urea=Urea 46% Nitrogen Prilled Arcadian Ohio L.P.

GEL=Gelatin—250 Bloom Strength Kind And Knox

PEG=Polyethylene Glycol—Carbowax 1450 Union Carbide

HEC=Hydroxyethylcellulose—Kuminal Hercules Inc.

DP=DP6-6066—Acrylic Superabsorber Allied Colloids

BAC=Bacote 20—Crosslinking Agent—Magnesium Elektron, Ltd.
Talc=Talc—Nytal 300—R. T. Vanderbilt
Polkote=66433=Clay Filled Dispersion With Synthetic Resin Binder—H&N Chemical
PC=Polycup172—Crosslinking Agent Hercules Inc.
Zinc Ammonium Carbonate—Cross-linking Agent Chemical Corp. of America The following primers were used, where indicated as a adhesion promoting layer on the film substrate to improve hydrophilic layer adhesion:
937-3=AS937-3 Polyolefin Primer—Adhesion Systems Inc.
PEI=Polyethylene Imine (PEI)—BASF—Known to those in the art as a primer for Polyolefin substrates.

The following components were used for wet labeling to activate the hydrophilic layer or function as an intermediate adhesive layer:
Water ($H_2O$)
OC363=OC363—20 Resin based labeling adhesive for Polyethylene containers.
242=Findley 242 361M Casein Based labeling adhesive for glass.
BL300=Henkel BL300—Starch and Styrene Maleic Anhydride—Based Adhesive for Brewery Applications.

The labels were prepared by Laboratory and Pilot Scale Production Techinques using the material set forth in Table 1:

TABLE 1

| SAMPLE # | WEIGHT/ (LBS) 3000 SQ FT. | % OF COMPONENT DRV (APPROX.) | | | | | | | | | |
|---|---|---|---|---|---|---|---|---|---|---|---|
| | | DX | 1072 | O5413A | PVA | GEL | 66433 | HEC | DP | UREA | PEG | TALC |
| 1 | 1.60 | 75 | 21 | — | — | — | — | — | — | — | — | 4 |
| 2 | 2.10 | 75 | 21 | — | — | — | — | — | — | — | — | 4 |
| 3 | 2.75 | 75 | 21 | — | — | — | — | — | — | — | — | 4 |
| 4 | 3.30 | 75 | 21 | — | — | — | — | — | — | — | — | 4 |
| 5 | 4.10 | 75 | 21 | — | — | — | — | — | — | — | — | 4 |
| 6 | 5.6 | 75 | 21 | — | — | — | — | — | — | — | — | 4 |
| 7 | 3.30 | 75 | 25 | — | — | — | — | — | — | — | — | — |
| 8 | 3.30 | 73 | 21 | — | — | — | — | — | — | 2 | — | 4 |
| 9 | 3.30 | 73 | 21 | — | — | — | — | — | — | 2 | — | 4 |
| 10 | 3.30 | 75 | 21 | — | — | — | — | — | — | — | — | 4 |
| 11 | 3.30 | 75 | 21 | — | — | — | — | — | — | — | — | 4 |
| 12 | 3.75 | 65 | — | 35 | — | — | — | — | — | — | — | 4 |
| 13 | 3.75 | 65 | — | 35 | — | — | — | — | — | — | — | — |
| 14 | 3.9 | — | — | — | 100 | — | — | — | — | — | — | — |
| 15 | 3.9 | — | — | — | 100 | — | — | — | — | — | — | — |
| 16 | 3.9 | — | — | — | 100 | — | — | — | — | — | — | — |
| 17 | 3.1 | 72 | — | 20 | — | — | — | — | — | — | 8 | — |
| 18 | 3.1 | 72 | — | 28 | — | — | — | — | — | — | — | — |
| 19 | 4.5 | — | — | — | — | 100 | — | — | — | — | — | — |
| 20 | 4.8 | — | — | — | — | 98 | — | — | — | — | — | 2 |
| 21 | 4.5 | — | — | — | — | 98 | — | — | — | — | 2 | — |
| 22 | 3.5 | — | — | — | — | — | 100 | — | — | — | — | — |
| 23 | 3.5 | — | — | — | — | — | 100 | — | — | — | — | — |
| 24 | 3.9 | 50 | — | — | — | — | 50 | — | — | — | — | — |
| 25 | 4.2 | — | — | — | — | — | — | 100 | — | — | — | — |
| 26 | 4.2 | — | — | — | — | — | — | 95 | — | — | 5 | — |
| 27 | | — | — | — | — | — | — | — | — | — | — | — |
| 28 | — | — | — | — | — | — | — | — | — | — | — | — |
| 29 | — | — | — | — | — | — | — | — | — | — | — | — |
| 30 | 1.4 | — | — | — | — | — | — | — | 100 | — | — | — |
| 31 | 1.4 | — | — | — | — | — | — | — | 100 | — | — | — |
| 32 | 1.4 | — | — | — | — | — | — | — | 100 | — | — | — |
| 33 | 1.4 | — | — | — | — | — | — | — | 98 | — | — | 2 |
| 34 | 3.2 | — | — | — | — | — | — | — | 100 | — | — | — |
| 35 | 3.2 | — | — | — | — | — | — | — | 99 | — | 1 | — |
| 36 | 3.2 | — | — | — | — | — | — | — | 98 | — | 1 | 1 |
| 37 | 3.2 | — | — | — | — | — | — | — | 97 | — | 1 | 2 |
| 38 | 3.2 | — | — | — | — | — | — | — | 100 | — | — | — |

| SAMPLE # | CROSSLINKING AGENT IN WATER OR ADHESIVE OR HYDROSCOPIC | | PRIMEN 0.1 WEIGHT/ 3000 SQ FT | | WET LABELING SOLUTION AND APPROX. APPLICATION WEIGHT | | | |
|---|---|---|---|---|---|---|---|---|
| | PC | ZLAC | PEI | 937-3 | WATER | OC363 | 242 | BL300 |
| 1 | — | — | ✓ | — | — | 3.2 | — | — |
| 2 | — | — | ✓ | — | — | 3.2 | — | — |
| 3 | — | — | ✓ | — | — | 3.2 | — | — |

-continued

| SAMPLE # | CROSSLINKING AGENT IN WATER OR ADHESIVE OR HYDROSCOPIC | | PRIMEN 0.1 WEIGHT/ 3000 SQ FT | | WET LABELING SOLUTION AND APPROX. APPLICATION WEIGHT | | | |
|---|---|---|---|---|---|---|---|---|
| | PC | ZLAC | PEI | 937-3 | WATER | OC363 | 242 | BL300 |
| 4 | — | — | ✓ | — | — | 3.2 | — | — |
| 5 | — | — | ✓ | — | — | 3.2 | — | — |
| 6 | — | — | ✓ | — | — | 3.2 | — | — |
| 7 | — | — | — | — | — | 3.2 | — | — |
| 8 | — | — | — | — | — | 6.0 | — | — |
| 9 | — | — | — | — | — | 3.2 | — | — |
| 10 | — | — | — | — | — | — | — | 4.25 |
| 11 | — | — | — | — | 3.2 | — | — | — |
| 12 | — | — | — | — | 3.2 | — | — | — |
| 13 | — | — | — | — | — | — | 4.0 | — |
| 14 | — | 2% in Hydrophilic | — | — | — | 3.4 | — | — |
| 15 | — | 2% in Hydrophilic | — | — | 4.0 | — | — | — |
| 16 | — | — | ✓ | — | 3.2 | — | — | — |
| 17 | — | — | — | — | — | — | — | 4.25 |
| 18 | — | — | — | — | — | — | — | 4.25 |
| 19 | — | — | ✓ | — | 3.2 | — | — | — |
| 20 | — | 3% in Hydrophilic | ✓ | — | — | — | — | 4.25 |
| 21 | — | 3% in Hydrophilic | — | — | — | 3.2 | — | — |
| 22 | — | — | — | — | — | 3.6 | — | — |
| 23 | — | — | — | — | — | 3.6 | — | — |
| 24 | — | — | — | — | — | 3.6 | — | — |
| 25 | — | — | — | ✓ | — | 3.6 | — | — |
| 26 | — | — | — | — | 3.2 | — | — | — |
| 27 | — | — | — | — | — | 3.9 | — | — |
| 28 | — | — | — | — | — | — | 3.0 | — |
| 29 | — | — | — | — | 3.2 | — | — | — |
| 30 | 0.5% in water | — | — | — | 3.2 | — | — | — |
| 31 | 0.5% in water | — | — | — | — | 3.2 | — | — |
| 32 | — | — | — | — | 3.2 | — | — | — |
| 33 | — | — | — | — | 3.2 | — | — | — |
| 34 | — | — | — | — | 3.2 | — | — | — |
| 35 | — | — | — | — | 3.2 | — | — | — |
| 36 | — | — | — | ✓ | — | — | — | 4.2 |
| 37 | — | — | — | — | — | 3.2 | — | — |
| 38 | — | 1% in DP | — | ✓ | 3.2 | — | — | — |

| SAMPLE # | LABEL SUBSTRATE | | | | SUBSTRATE LABEL APPLIED TO | |
|---|---|---|---|---|---|---|
| | CLEAR OPP | WHITE OPP | CLEAR PET | WHITE HDPE | CLEAR GLASS | HDPE |
| 1 | — | ✓ | — | — | — | ✓ |
| 2 | — | ✓ | — | — | — | ✓ |
| 3 | — | ✓ | — | — | — | ✓ |
| 4 | — | ✓ | — | — | — | ✓ |
| 5 | — | ✓ | — | — | — | ✓ |
| 6 | — | ✓ | — | — | — | ✓ |
| 7 | — | ✓ | — | — | — | ✓ |
| 8 | — | ✓ | — | — | — | ✓ |
| 9 | — | — | ✓ | — | — | ✓ |
| 10 | — | — | ✓ | — | ✓ | — |
| 11 | — | — | ✓ | — | ✓ | — |
| 12 | ✓ | — | — | — | ✓ | — |
| 13 | ✓ | — | — | — | ✓ | — |
| 14 | — | ✓ | — | — | — | ✓ |
| 15 | ✓ | — | — | — | ✓ | — |
| 16 | ✓ | — | — | — | — | ✓ |
| 17 | ✓ | — | — | — | ✓ | — |
| 18 | ✓ | — | — | — | ✓ | — |
| 19 | ✓ | — | — | — | ✓ | — |
| 20 | — | ✓ | — | — | ✓ | — |
| 21 | — | ✓ | — | — | — | ✓ |
| 22 | — | ✓ | — | — | — | ✓ |
| 23 | ✓ | — | — | — | — | ✓ |
| 24 | — | — | — | ✓ | — | ✓ |
| 25 | ✓ | — | — | — | ✓ | — |
| 26 | ✓ | — | — | — | ✓ | — |

-continued

| SAMPLE # | LABEL SUBSTRATE | | | | SUBSTRATE LABEL APPLIED TO | |
|---|---|---|---|---|---|---|
| | CLEAR OPP | WHITE OPP | CLEAR PET | WHITE HDPE | CLEAR GLASS | HDPE |
| 27 | — | ✓ | — | — | — | ✓ |
| 28 | — | ✓ | — | — | ✓ | — |
| 29 | — | — | — | ✓ | — | ✓ |
| 30 | — | — | — | ✓ | — | ✓ |
| 31 | — | ✓ | — | — | ✓ | — |
| 32 | — | ✓ | — | — | ✓ | — |
| 33 | — | ✓ | — | — | ✓ | — |
| 34 | — | — | ✓ | — | ✓ | — |
| 35 | — | — | ✓ | — | ✓ | — |
| 36 | ✓ | — | — | — | — | ✓ |
| 37 | ✓ | — | — | — | ✓ | — |
| 38 | — | — | ✓ | — | — | ✓ |

Samples of the coated polymeric films were applied to HDPE or glass in laboratory scale or in field trial using commercial labeling machines. They were evalated for the following properties:

1. Dry tack for handling before being affixed to the container.
2. Dry flat (non curling)
3. Wet tack
4. Wet adhesion
5. Drying
6. Dry adhesion
7. Optical clarity if a clear substrate was employed.

The results which are set forth in Table 2 are based on actual observations which were used to assign subjectively determined ratings of Excellent (E), Good Poor (P) or Fail (F).

TABLE II

| SAMPLE # | DRY TACK BEFORE LABELING | LAY FLAT | WET TACK | WET ADHESION | DRYING RATE | DRY ADHESION 12 HRS | DRY ADHESION 24 HRS | DRY ADHESION 7 DAY |
|---|---|---|---|---|---|---|---|---|
| 1 | G | E | F | F | F | F | F | G |
| 2 | G | E | F | F | F | G | G | G |
| 3 | G | G | G | G | G | G | G | G |
| 4 | G | G | G | G | G | G | G | G |
| 5 | G | P | E | E | E | G | E | E |
| 6 | F | F | E | B | E | E | E | E |
| 7 | P | G | G | G | G | G | G | G |
| 8 | G | E | P | P | F | F | G | G |
| 9 | G | G | G | G | G | P | F | F |
| 10 | G | F | G | G | G | G | G | G |
| 11 | G | G | G | P | G | P | P | P |
| 12 | G | F | G | P | G | P | P | P |
| 13 | G | F | G | G | G | G | G | E |
| 14 | G | F | E | G | G | P | F | F |
| 15 | G | F | G | E | G | P | P | P |
| 16 | G | F | B | E | E | P | P | P |
| 17 | P | E | E | E | G | F | G | E |
| 18 | F | F | E | E | G | G | G | E |
| 19 | P | P | E | B | E | G | G | G |
| 20 | G | P | B | E | E | G | G | E |
| 21 | P | G | B | B | G | G | G | G |
| 22 | E | E | F | F | F | P | P | P |
| 23 | E | E | F | F | F | P | P | P |
| 24 | E | B | G | G | G | F | G | E |
| 25 | F | P | G | F | F | P | F | G |
| 26 | P | F | G | F | P | P | P | P |
| 27 | P | P | P | P | P | P | P | P |
| 28 | P | P | P | P | P | P | P | P |
| 29 | P | P | P | P | P | P | P | P |
| 30 | G | G | E | B | E | E | E | B |
| 31 | G | G | B | G | G | G | G | E |
| 32 | G | G | E | E | E | G | G | E |
| 33 | E | G | B | E | B | E | E | E |
| 34 | P | P | E | E | E | E | E | E |
| 35 | P | G | B | B | E | E | E | B |
| 36 | G | G | B | B | G | G | G | E |
| 37 | B | G | E | E | G | G | G | E |
| 38 | P | P | E | E | E | E | E | E |

| SAMPLE # | OPTICAL CLARITY | MOISTURE RESISTANCE 24 HR. WATER SOAK |
|---|---|---|
| 1 | — | G |
| 2 | — | F |
| 3 | — | F |

-continued

| SAMPLE # | OPTICAL CLARITY | MOISTURE RESISTANCE 24 HR. WATER SOAK |
|---|---|---|
| 4 | — | F |
| 5 | — | F |
| 6 | — | F |
| 7 | — | F |
| 8 | — | F |
| 9 | — | F |
| 10 | — | G |
| 11 | — | P |
| 12 | F | P |
| 13 | F | G |
| 14 | — | F |
| 15 | G | F |
| 16 | G | F |
| 17 | F | F |
| 18 | F | F |
| 19 | G | P |
| 20 | — | G |
| 21 | — | G |
| 22 | — | P |
| 23 | — | P |
| 24 | — | F |
| 25 | — | P |
| 26 | F | P |
| 27 | P | P |
| 28 | — | P |
| 29 | — | P |
| 30 | — | E |
| 31 | E | G |
| 32 | E | P |
| 33 | — | E |
| 34 | E | P |
| 35 | E | P |
| 36 | G | E |
| 37 | G | G |
| 38 | E | G |

I claim:

1. A method for fastening a polymeric label from roll sheet stock that is cut by machine to label size, to a glass, plastic or metal container or to a glass, metal or plastic surface in post mold labeling operations using wet applied water based labeling equipment used for the application of paper labels and a water based adhesive composition, said method comprising:
   (a) applying a layer of a hydrophilic solid material to said polymeric label to form a hydrophilic layer on said polymeric label and thereafter drying said hydrophilic layer;
   (b) applying water to said hydrophilic layer to form a fastenable polymeric label;
   (c) fastening said fastenable polymeric label to a glass, plastic or metal container using wet applied water based labeling equipment used for the application of paper labels; and
   (d) allowing said polymeric label to dry on said glass, plastic or metal container.

2. A method as defined in claim 1 wherein the water contains a cross-linker.

3. A method for fastening a polymeric label from roll sheet stock that is cut by machine to label size, to a glass, plastic or metal container or to a glass, metal or plastic surface in post mold labeling operations using labeling equipment having a label magazine or gripper and a water based adhesive composition, said method comprising:
   (a) applying a layer of a hydrophilic solid material to said polymeric label to form a hydrophilic layer on said polymeric label and thereafter drying said hydrophilic layer;
   (b) applying water to said hydrophilic layer to form a fastenable polymeric label;
   (c) fastening said fastenable polymeric label to a glass, plastic or metal container using wet applied water based labeling equipment used for the application of paper labels; and
   (d) allowing said polymeric label to dry on said glass, plastic or metal container.

4. A method as defined in claim 3 wherein the water contains a cross-linker.

* * * * *